Nov. 28, 1933.    G. M. POWERS    1,936,855
ADJUSTABLE TRUSS PAD
Filed Sept. 18, 1931

Inventor,
George M. Powers,
By Arthur H. Ewald
Attorney.

Patented Nov. 28, 1933

1,936,855

UNITED STATES PATENT OFFICE 1,936,855

ADJUSTABLE TRUSS PAD

George M. Powers, Cincinnati, Ohio, assignor to The Ohio Truss Company, a corporation of Ohio Application September 18, 1931
Serial No. 563,551

6 Claims. (Cl. 128—116)

My invention relates to truss pads of the type used for the treatment of hernia and similar conditions.

The principal object of the present invention is to provide a truss pad of the type mentioned having a plurality of adjustments whereby the pad may be rendered comfortable and efficient during the varying conditions of use. In the accomplishment of said purpose, my invention comprises in general the use of a truss pad adjustable on the shank, so that the pad as a whole may be given varying relations to the truss spring, and also more particularly, means whereby the pad proper may be given varying contour so that the central or principal contacting portion thereof may be caused to bear properly and efficiently upon the area to be treated.

Further objects of my invention will appear from the following detailed description thereof.

Figure 1:
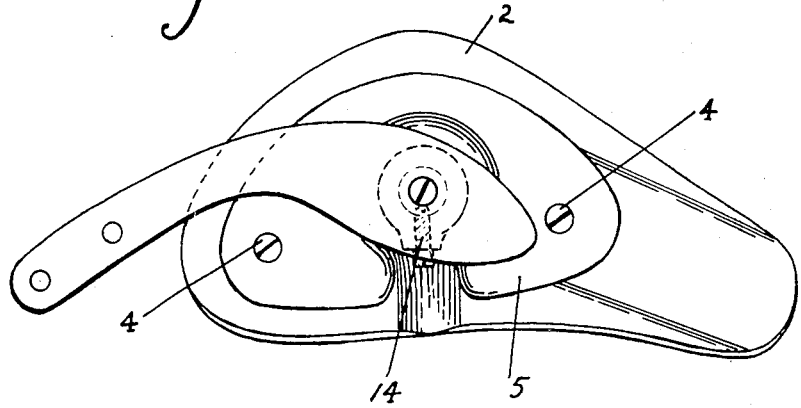
Figure 1 is a back view of a truss pad constructed in accordance with this invention.
Figure 2:
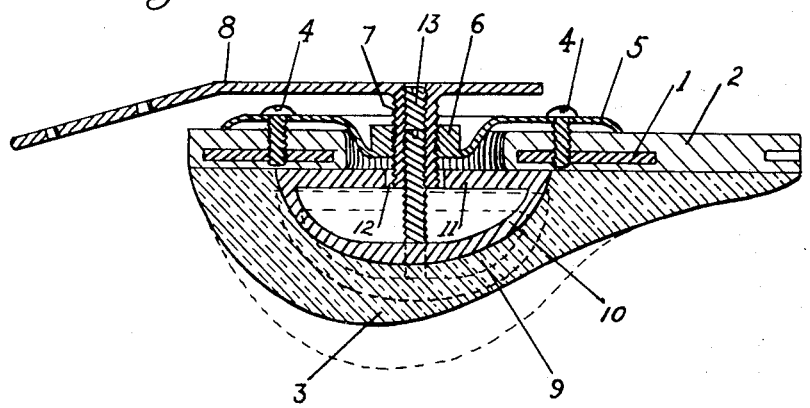
Figure 2 is a longitudinal sectional view of the same.

The numeral 1 indicates a base plate on which a resilient pad 2 is moulded. The pad 2 has a hollow head section 3, the surrounding wall of said head portion being comparatively thin so as to give a high degree of elasticity. Secured to the pad by means of screws 4 which thread into the base plate 1 is the usual back plate 5. The middle portion of the plate 5 is depressed as clearly shown in Figure 2 and secured therein, or integrally formed therewith is a nut 6. A hollow shank 7 is secured to the usual bar 8 whereby the pad may be secured to the truss spring in the ordinary manner. The hollow shank 7 is externally threaded so as to screw into the nut 6, and it will thus be seen that the pad may be adjusted toward and away from the bar 8 by screwing same on or off the shank 7.

A set screw 14 is arranged to engage the shank 7 through the nut 6 so as to secure the pad adjustment on said shank.

Located in the inner cavity 9 of the pad 2, is a follower 10, the same being constructed of hard rubber or other rigid material. The follower 10 is preferably hollow and the back wall 11 of the same has an opening 12 which slides freely over the shank 7 and serves as a guide to hold the follower front in proper relation to the pad. The shank 7 is internally threaded to receive a pin 13, the inner end of which bears against the inside of the follower 12.

The nature and use of my new adjustable truss pad will be apparent from the foregoing description to those skilled in the art to which the same appertains.

The pad as a whole may be adjusted on the shank 7 toward and away from the supporting bar 8, thus giving the entire pad greater or less compression against the person of the wearer. Such adjustment when satisfactorily attained is secured by the set screw 14. The head portion 3 of the pad may be given varying contour by means of the follower 10 which is operated by the screw pin 13. If it is desired, by reason of the nature of the rupture to provide the pad with a pronounced or prominent head, the screw pin is screwed inwardly forcing the follower to distend the head 3 of the pad. When conditions do not require a prominently projecting head on the pad, the pin is screwed backwardly through the shank 7, thus permitting the elastic pad head to force the follower inwardly, giving to the head a more even and continuous contour.

As will be apparent, the follower 10 may be given any desired shape, and it will affect the contour of the pad head accordingly, the design and shape of the follower having reference to the particular condition to be treated.

Having thus fully described my invention, what I claim as new and desire to secure by Letters Patent is:

1. An adjustable truss pad comprising in combination with a support a hollow threaded shank on said support, a hollow elastic head, means whereby said head may be threaded on said shank, a follower in said head, and means extending through said shank and arranged to engage said follower for the adjustment of said follower therein independently of the adjustment of said head on said shank.

2. An adjustable truss pad comprising in combination with a support, a hollow threaded shank on said support, a hollow elastic head, means whereby said head may be threaded on said shank, a follower in said head, and a pin threaded through said shank and arranged to engage said follower for adjusting the same in said head.

3. An adjustable truss pad comprising in combination with a support, a hollow threaded shank on said support, a hollow elastic head, means whereby said head may be threaded on said shank, means for securing same in adjustment thereon, a follower in said head, and means extending through said shank and arranged to engage said follower for the adjustment of said follower therein independently of the adjustment of said head on said shank.

4. An adjustable truss pad comprising in combination with a support, a hollow threaded shank on said support, a hollow elastic head, means whereby said head may be threaded on said shank, means for securing same in adjustment thereon, a follower in said head and a pin threaded through said shank and arranged to engage said follower for adjusting the same in said head.

5. An adjustable truss pad comprising in combination with a support, a hollow threaded shank on said support, a hollow elastic head, means whereby said head may be threaded on said shank, a hollow follower in said head, the back wall of said follower having an opening adapted to slide freely over said shank, and a pin threaded through said shank and arranged to engage the inside of said follower for adjusting the same in said head.

6. An adjustable truss pad comprising in combination with a support, a hollow threaded shank on said support, a hollow elastic head, means whereby said head may be threaded on said shank, means for securing same in adjustment thereon, a hollow follower in said head, the back wall of said follower having an opening adapted to slide freely over said shank, and a pin threaded through said shank and arranged to engage the inside of said follower for adjusting the same in said head.

GEORGE M. POWERS.